Oct. 21, 1958  A. W. HUGHES  2,856,977
MEAT CHOPPING APPARATUS
Filed March 7, 1956  2 Sheets-Sheet 1

INVENTOR.
ALVIN W. HUGHES
BY
Christopher L. Waal
ATTORNEY

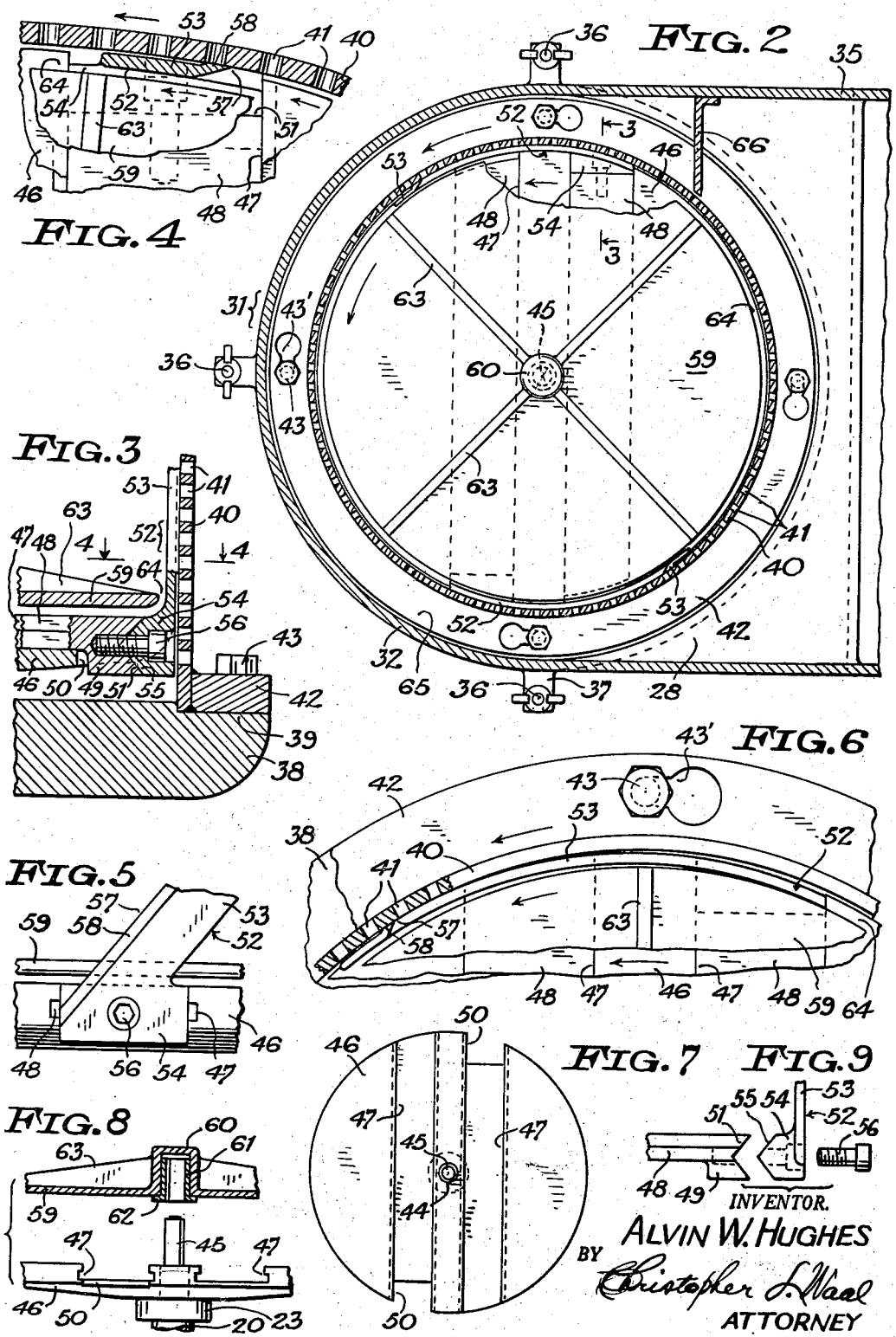

United States Patent Office 2,856,977
Patented Oct. 21, 1958

2,856,977

MEAT CHOPPING APPARATUS

Alvin W. Hughes, Elmhurst, Ill.

Application March 7, 1956, Serial No. 570,016

9 Claims. (Cl. 146—93)

The present invention relates to chopping or comminuting apparatus for meat and the like.

A type of meat chopping apparatus heretofore devised and disclosed in United States Patent 2,637,359 to William H. Taylor, issued May 5, 1953, includes a rotatable meat-receiving drum or basket with perforations into which portons of a rotating meat mass within the drum are extruded by centrifugal force, the extruded meat portions being severed by differentially rotatable knife means centrifugally bearing on the inner surface of the drum and carried on a driving rotor coaxially arranged within the drum.

An object of the invention is to provide an improved and efficient meat chopping apparatus of this general type in which the rotating meat mass in the perforated drum is supported in such manner as to substantially reduce the power requirements for a given meat chopping capacity and minimize heating of the meat.

Another object is to support the rotating meat mass in the perforated drum on a freely rotatable disk coaxially overlying the knife-driving rotor, thus avoiding frictional contact of the meat with this rotor.

Still another object is to provide improved means for insuring good shearing contact between a centrifugally influenced knife of the apparatus and the inner surface of the rotatable perforated drum.

A further object is to provide improved and simplified means for firmly mounting the knife on a movable supporting member.

The invention further consists in the several features hereinafter described and claimed.

In the accompanying drawings,

Fig. 2 is a transverse horizontal sectional view on a slightly reduced scale, taken generally on the line 2—2 of Fig. 1;

Fig. 3 is a detail vertical sectional view on an enlarged scale, taken generally on the line 3—3 of Fig. 2;

Fig. 4 is a detail horizontal sectional view on a still larger scale, taken generally on the line 4—4 of Fig. 3;

Fig. 5 is a fragmentary side view of a knife-carrying rotor on the same scale as Fig. 3;

Fig. 6 is a fragmentary top view, on the same scale as Fig. 3, of rotary elements of the device, as they appear when the device is at rest, parts being shown in section;

Fig. 7 is a top view, on a reduced scale, of a rotary knife-supporting disk with the knives removed;

Fig. 8 is a fragmentary detail view, on a reduced scale, of separated rotary elements of the device, parts being shown in section, and Fig. 9 is a fragmentary detail exploded view, on an enlarged scale, of one of the knife mountings.

Figure 1:
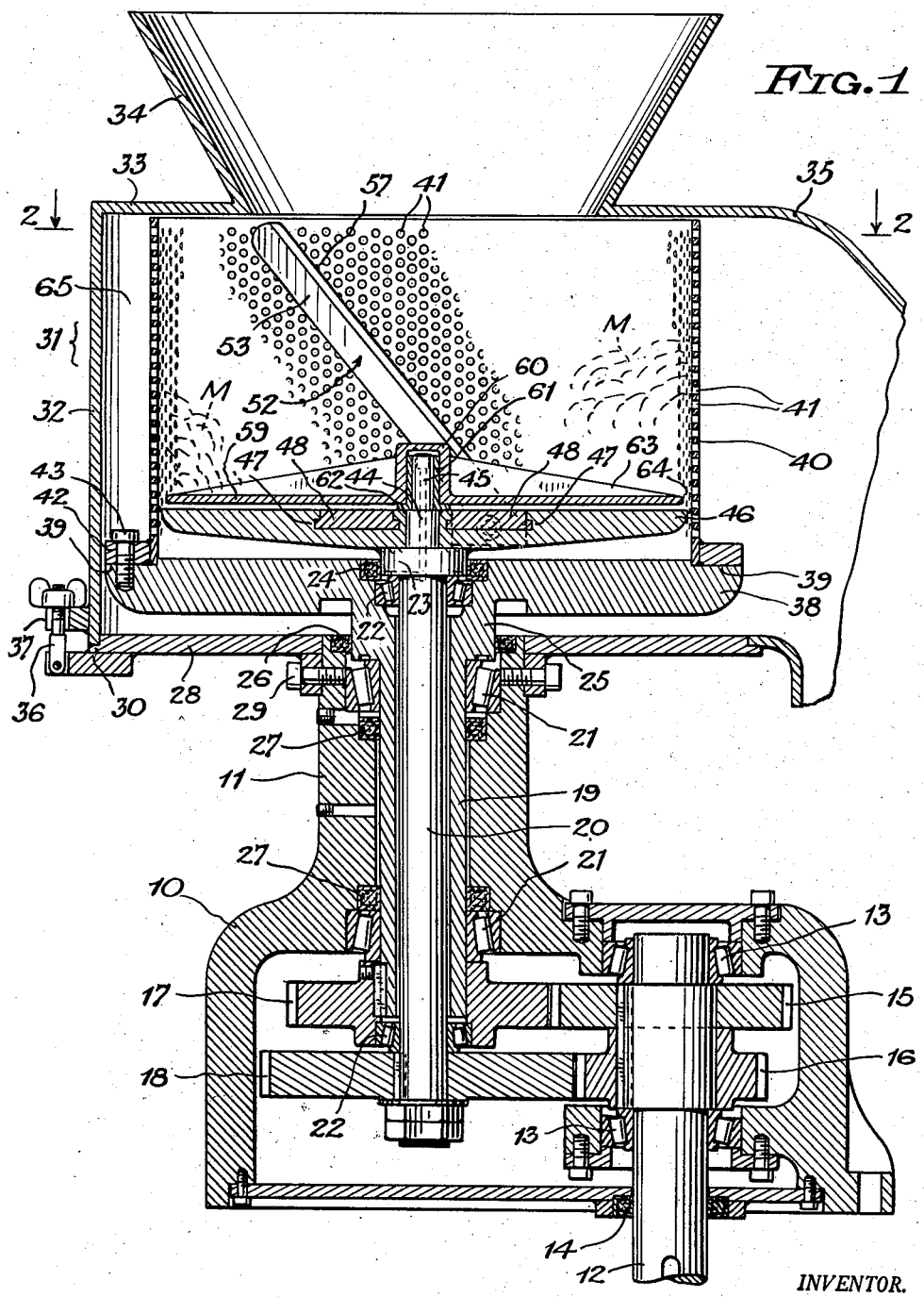
Fig. 1 is a vertical axial sectional view of a meat chopping device embodying the invention.

In the drawing, 10 designates a frame or support in the form of a gear case including an upstanding tubular portion or pillar 11. A vertical drive shaft 12 in offset relation to the pillar is journalled in the gear case, as by tapered roller bearings 13, and projects downwardly from the gear case through an oil seal 14 for driving connection with a suitable source of power, such as an electric motor, not shown. Within the gear case driving pinions 15 and 16 of different pitch diameter are keyed on the drive shaft and mesh with respective gears 17 and 18 which are keyed on the lower ends of concentric vertical shafts 19 and 20 extending upwardly through the hollow pillar 11. The tubular outer shaft 19 is journalled in upper and lower tapered roller bearings 21 mounted in the pillar, and the inner shaft 20 is journalled in upper and lower tapered roller bearings 22, the upper bearing being mounted in the upper end portion of the outer shaft, and the lower bearing being mounted in the lower end portion of the gear 17. A collar 23 formed on the inner shaft 20 near the upper end thereof rests on the inner race of the upper bearing 22 and is surrounded by an oil seal 24 mounted in the outer shaft. The outer shaft 19 has an upper hub portion 25 which rests on the inner race of the upper bearing 21 and is surrounded by an oil seal 26 mounted in the upper end of the pillar 11. Other oil seals 27 mounted in the pillar engage the outer shaft between and adjacent to the bearings 21.

The upper end of the pillar 11 is reduced and extends through a downwardly hubbed horizontal plate 28 which is rigidly secured to the pillar 11, as by screws 29, the plate having a rabbeted marginal portion 30. A superposed casing 31 forms a chopping chamber with the plate 28 and comprises an arcuate vertical wall 32, a horizontal top wall 33 with a central feed hopper 34, and a lateral discharge section 35. The lower edge of the vertical wall 32 interfits with the rabbeted marginal portion 30 of the horizontal plate 28 and is detachably secured thereto by clamping bolts 36 pivotally carried by the plate, each bolt engaging a notched lug 37 welded to the wall 32.

The concentric shafts 19 and 20 are driven in the same direction but at different speeds, the outer shaft 19 being preferably rotated at a higher speed than the inner shaft. A flywheel-forming disk 38 with an annular marginal rabbet 39 at its upper side is integrally formed on the upper end of the tubular shaft 19 and is spaced a short distance above the bottom casing plate 28. A foraminous basket-forming cylinder or drum 40 with perforations 41 is rigidly mounted on the disk 38 coaxially of the shaft 19 and has a bottom clamping ring or flange 42 which is seated in the annular rabbet 39 and is secured to the disk by screws 43 passing through keyhole slots 43' in the flange. The upper edge of the hollow cylinder is close to the under side of the casing top wall 33, and the central discharge opening of the feed hopper 34 is of smaller diameter than the cylinder. As in the above Taylor patent, meat introduced into the foraminous cylinder will be centrifugally extruded into the cylinder perforations.

The inner vertical shaft 20 has a reduced cylindrical portion 44 projecting above the collar 23, and an upper cylindrical end portion or extension 45 which is further reduced and forms a pivot or pilot bearing, as hereinafter described. A centrally apertured flat-topped disk 46 fits over the shaft portion 44 and rests on the collar 23 to which it is rigidly secured, as by welding, so as to form a part of the shaft 20. The disk 46, which is slightly smaller in diameter than the inner diameter of the perforated cylinder, is provided in its upper surface with a pair of parallel undercut channels or ways 47 disposed at opposite sides of the axis of the disk, the inner edges of the ways being close to the shaft portion 44. Flat cross slides 48 of identical construction fit in the respective ways 47 for limited reciprocation therein, the upper surfaces of the slides being flush with the upper surface of the disk 46. Each slide has an end lug 49, Fig. 3, which extends downwardly into a clearance notch 50 formed in the disk at an end of the associated channel 47. The end face of the lug has a horizontally extending V-groove 51, Figs. 3 and 9, arranged transversely of the slide and in a tangential or peripheral direction with respect to the rotor disk.

The slides 48 carry respective shear knives 52 which are arranged at diametrically opposite regions of the cylinder 40. Each knife comprises a resilient blade 53 projecting upwardly from an end mounting lug 54, the blade extending in a generally axial direction with respect to the cylinder, and the lug having a horizontally extending V-shaped rib 55 which fits in the transverse V-groove 51 of the associated slide and is detachably secured to the slide by a horizontal screw 56 threaded into the slide, as best seen in Fig. 3. The knives are formed of suitable metal, such as stellite, and the knife blades 53 are preferably, although not necessarily, given a rake or inclination from the vertical. Each blade has a cutting edge 57 formed along a land 58 which is exteriorly finished to fit against the interior cylindrical surface of the perforated cylinder when the machine is in operation, so that the cutting edge will move with a shearing action across the perforations in the cylinder to sever meat portions which have been centrifugally extruded into the perforations. However, the knife is so shaped in its unstressed condition that when the machine is started in operation the tip or upper end of the knife blade 53 will engage the cylinder wall first, as shown in Fig. 6, the lower portion of the knife blade being then spaced inwardly from the cylinder wall. As the speed increases, centrifugal force then progressively brings the entire cutting edge of the knife against the cylinder wall. This arrangement insures proper contact of the diametrically opposite knife blades with the cylinder wall. There is practically no wear on the knife blades, since there is only a slow relative movement between the knives and the cylinder. Also, the knives tend to keep themselves sharp.

The meat M introduced into the cylinder 40 tends to rotate therewith at about the same speed as the cylinder, which however is faster than the speed of the knife-carrying disk 46. In order to avoid frictional drag between the meat and this disk, a rotatable meat-supporting disk 59 closely overlies the knife-carrying disk in coaxial relation thereto and is rotatably mounted on the projecting upper end portion 45 of the shaft 20 for free or "floating" rotation thereon. The meat-supporting disk has a central hollow hub 60 in which is pressed a bushing 61 with an annular bottom flange 62, the bushing being formed of porous lubricant-containing metal, and the hub being closed at its upper end. The shaft end 45 rotatably fits in the bushing, and the bottom flange of the bushing rotatably bears on the flat upper face of the disk 46, thus spacing the bottom face of the meat-supporting disk 59 a short distance above the disk 46. The meat-supporting disk 59 is further provided with radial ribs 63 extending outwardly from the hub 60 and tapering toward their outer ends. The ribs 63 have a clutching interengagement with the rotating meat body supported on the disk 59, thus driving the disk at substantially the same speed as the meat body. A narrow annular slot or gap 64 is formed between the periphery of the disk 59 and the inner surface of the perforated cylinder 40, and the knife blades 53 extend upwardly through this slot.

Meat portions centrifugally extruded into the drum perforations 41 and sheared off by the knives 52 fly outwardly into the arcuate space or chamber 65 between the drum and the casing wall 32 from which they are impelled into the discharge section 35. Some of the severed meat portions also fly directly into the discharge section. Preferably, a deflector 66 extends from a side wall of the discharge section to the vicinity of the outer wall surface of the drum near the entrance portion of the chamber 65 to keep fatty material from packing in the chamber. The chamber 65 is here shown to be of uniform radial width, but it may be in the form of a volute, as in the above Taylor patent.

The knife-carrying slides 48 are inserted endwise in the guideways 47 of the disk 46 and are installed on the disk in the absence of the casing 32 and perforated drum 40. The casing and drum, and also the meat-supporting disk 59, are readily dismounted to facilitate cleaning of the various parts.

The machine may be made in various sizes to suit the requirements of the user. By way of example, in a machine having a perforated cylindrical drum with a diameter of about 12½ inches, it is found desirable to rotate the drum at a speed of approximately 1500 R. P. M. and to rotate the knives at a speed of approximately 990 R. P. M. in the same direction, thus producing a differential or relative knife speed of approximately 510 R. P. M. However, either the drum or the knives may be rotated faster than the other. In Fig. 2, both the drum and the knives are shown to be rotated counter-clockwise, but the effect is the same as if both were rotated clockwise with the knife blades operating at a higher speed than the drum. With the cylinder and knives arranged as shown in the drawing the cutting action will result in a lifting effect on the meat within the drum.

As in the device of the above Taylor patent, the cutting action on the meat is such as to reduce cell disruption, the severed meat portions retaining most of the meat juices which are expressed from the meat in the conventional screw-thread grinder. Any bones entering the drum will not be impacted or crushed but will simply whirl around in the drum, and all available portions of the meat clinging on the bones will be extruded and sheared off without damaging the knives.

In operation, the meat or other material to be cut up into small pieces is revolved at high speed in the container-forming drum 40, being introduced therein through the hopper 34. The meat, which is in a soft but refrigerated condition, is thrown outwardly by centrifugal force against the cylindrical inner surface of the drum, the force being sufficient to cause portions of the meat to be extruded into the perforations or apertures of the drum, the size of the apertures determining the size of the pieces. In the course of relative movement between the drum and the knives 52, the extruded meat portions are sheared off by the knife blades 53 and fly outwardly through the apertures, the severed meat portions being suitably collected. The meat body in the drum tends to rotate at about the same speed as the drum, and the meat-supporting disk 59 also rotates at about this same speed. The meat body or mass is thus supported out of contact with the knife-driving disk 46 which rotates at a different speed than the drum.

An important feature of the present invention is that the meat is supported in the rotating drum in such manner as to effect a substantial reduction in friction losses. In a machine of a given capacity, the provision of the rotatable meat-supporting disk 59 will reduce the power requirements about one-third, and will minimize heating of the refrigerated meat.

I claim:

1. In a material comminutor, a rotatable material-receiving container with a perforated wall of circular cross-section, a differentially rotatable knife mounting disposed coaxially in the container, a knife on said mounting having a resilient cutting blade extending in a direction having a substantial component axially of the container, said blade being in centrifugal bearing engagement with the inner surface of said perforated wall for shearing off material centrifugally extruded in the wall perforations, and said blade having a tip portion which during starting of the comminutor engages the inner wall surface before succeeding portions of the blade are centrifugally engaged with said wall surface.

2. In a material comminutor, a rotatable material-receiving container with a perforated wall of circular cross-section, a differentially rotatable rotor disposed coaxially in the container, a radially movable member drivingly connected to said rotor, a knife carried by said member and centrifugally bearing against the inner surface of the perforated container wall for shearing off portions of material centrifugally extruded in the wall perforations, said knife including a base portion secured to said movable member and a resilient cutting blade extending from said base portion in a direction having a substantial component axially of the container, said resilient blade when unstressed having its tip portion at a greater radius from the axis of said container than said base portion, whereby said blade tip portion will contact the inner surface of the perforated wall before the rest of the blade when the comminutor is started in operation.

3. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, and bearing means coaxial with said rotor rotatably supporting said coaxial disk and permitting rotation of said disk at substantially the speed of said container.

4. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, said rotor being provided at its axial region with bearing means rotatably supporting said coaxial disk and permitting rotation of said disk at substantially the speed of said container.

5. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a coaxial bearing-forming shaft extension on said rotor, and a coaxial material-supporting disk in said container adjacently overlying said rotor and rotatably supported on said shaft extension for relative rotation thereon to rotate with the material in the container.

6. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, and bearing means coaxial with said rotor rotatably supporting said coaxial disk and permitting rotation of said disk at substantially the speed of said container, the periphery of said disk forming with the inner surface of said wall an annular slot through which the knife extends.

7. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, and bearing means coaxial with said rotor rotatably supporting said coaxial disk and permitting rotation of said disk at substantially the speed of said container, said disk having a ribbed upper surface adapted to engage the material in the container.

8. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, and bearing means coaxial with said rotor rotatably supporting said coaxial disk and permitting rotation of said disk at substantially the speed of said container, said disk having an upper surface with projections adapted to engage the material in the container.

9. In a material comminutor having a rotatable material-receiving container with a perforated wall of circular cross-section and further having a differentially rotatable knife-carrying rotor disposed coaxially in the container and provided with a knife bearing against the inner surface of the perforated wall for shearing off portions of material centrifugally extruded in the wall perforations, the combination, with said container and rotor, of a material-supporting disk in said container adjacently overlying said rotor in coaxial relatively rotatable relation thereto, and bearing means coaxial with said rotor rotatably supporting said coaxial disk and permitting rotation of said disk at substantially the speed of said container, said disk being radially ribbed at its upper surface for engagement with the material in the container.

References Cited in the file of this patent

UNITED STATES PATENTS

| | | |
|---|---|---|
| 1,583,755 | Schmidt | May 4, 1926 |
| 2,637,359 | Taylor | May 5, 1953 |
| 2,719,011 | Bebinger | Sept. 27, 1955 |